US008787664B2

(12) United States Patent
Gallo

(10) Patent No.: US 8,787,664 B2
(45) Date of Patent: Jul. 22, 2014

(54) AUTOMATICALLY MATCHING COLORS IN STEREOSCOPIC IMAGE PAIRS

(71) Applicant: Michael Gallo, Desenzano del Garda (IT)

(72) Inventor: Michael Gallo, Desenzano del Garda (IT)

(73) Assignee: Adobe Systems Incorporated, San Jose, CA (US)

( * ) Notice: Subject to any disclaimer, the term of this patent is extended or adjusted under 35 U.S.C. 154(b) by 106 days.

(21) Appl. No.: 13/625,535

(22) Filed: Sep. 24, 2012

(65) Prior Publication Data

US 2014/0086482 A1   Mar. 27, 2014

(51) Int. Cl.
*G06K 9/00*   (2006.01)
*G06K 9/34*   (2006.01)

(52) U.S. Cl.
USPC .......................................... 382/165; 382/154

(58) Field of Classification Search
USPC .......... 382/154, 162, 164, 165, 167; 345/420, 345/473, 593; 348/47, 50, 52, E13.074
See application file for complete search history.

(56) References Cited

U.S. PATENT DOCUMENTS

| 7,065,245 | B2 | 6/2006 | Toda |
| 7,680,354 | B2 | 3/2010 | Mei et al. |
| 8,208,009 | B2* | 6/2012 | Neuman ........................ 348/47 |
| 8,228,327 | B2* | 7/2012 | Hendrickson et al. ........ 345/420 |
| 2009/0096807 | A1* | 4/2009 | Silverstein et al. ............ 345/593 |
| 2012/0182397 | A1* | 7/2012 | Heinzle et al. .................. 348/47 |
| 2012/0189191 | A1* | 7/2012 | Bai et al. ........................ 382/154 |

OTHER PUBLICATIONS

Daniel L. Ruderman, Thomas W. Cronin, and Chuan-Chin Chiao, "Statistics of cone responses to natural images: implications for visual coding," J. Opt Soc. Am. A 15 (18), Aug. 1998. pp. 1-10.
Shi Shiming, Wang Lingxue, Jin Weiqi, Zhao Yuanmeng, "Color night vision based on color transfer in YUV color space," International Symposium on Photoelectronic Detection and Imaging 2007: Image Processing, Sep. 2007. pp. 1-12.

* cited by examiner

*Primary Examiner* — Amir Alavi
(74) *Attorney, Agent, or Firm* — Wolfe-SBMC

(57) ABSTRACT

A method, system, and computer-readable storage medium are disclosed for automatically matching colors in stereoscopic image pairs. A stereoscopic image pair is converted from a first color space to a second color space, comprising mapping color values in the first color space to color values in the second color space. The second color space is more perceptually uniform than the first color space. A color-matched stereoscopic image pair is generated in the second color space, comprising applying a respective transformation for each of a plurality of luminance ranges in each image of the stereoscopic image pair. The transformations are applied to the color values in the second color space dependent upon a contribution of each of the color values to each of the luminance ranges. The color-matched stereoscopic image pair is converted from the second color space to the first color space.

20 Claims, 7 Drawing Sheets

AUTOMATICALLY MATCHING COLORS IN STEREOSCOPIC IMAGE PAIRS

BACKGROUND

Description of the Related Art

Digital image processing is the process of analyzing and/or modifying digital images using a computing device, e.g., a computer system. Using specialized software programs, digital images may be manipulated and transformed in a variety of ways. Digital image processing programs may include programs of differing complexity such as limited-purpose programs associated with acquisition devices (e.g., digital cameras and scanners with bundled or built-in programs for managing brightness and contrast), limited editors suitable for relatively simple operations such as rotating and cropping images, and professional-grade programs with large and complex feature sets.

Digital photographs are typically digital images comprising raster graphics data. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green, blue) color space may comprise between one and eight bits per pixel for each of the red, green, and blue channels. An alpha channel may be used to store additional data such as per-pixel transparency values. A pair of digital photographs or a pair of other suitable digital images may form a stereoscopic image pair. Typically, the two images in a stereoscopic image pair are two views of the same scene taken from slightly different vantage points, such that viewing the stereoscopic image pair using appropriate display hardware may create an illusion of depth (i.e., a perception of three-dimensionality) for the viewer. A sequence of stereoscopic image pairs may be used to implement three-dimensional (3D) digital video.

When the stereoscopic image pair is captured, the capture device (e.g., a digital camera) may introduce unwanted artifacts such as differences in colorimetric values between the two images in the pair. For example, one image in the pair may be captured directly, and the other image may be captured using a mirror. Imperfections in the mirror may produce a color distortion in one of the images. Accordingly, it is desirable to have techniques for correcting the color distortion in a stereoscopic image pair. Prior solutions that rely on look-up tables to implement a color-matching transformation tend to reduce the number of colors in the images and thus may produce undesirable artifacts such as color banding and posterization.

SUMMARY

Various embodiments of systems, methods, and computer-readable storage media for automatically matching colors in stereoscopic image pairs are disclosed. A stereoscopic image pair may be converted from a first color space to a second color space, comprising mapping color values in the first color space to color values in the second color space. In one embodiment, the second color space is more perceptually uniform than the first color space. A color-matched stereoscopic image pair may be generated in the second color space, comprising applying a respective transformation for each of a plurality of luminance ranges in each image of the stereoscopic image pair. The transformations may be applied to the color values in the second color space dependent upon a contribution of each of the color values to each of the luminance ranges. The color-matched stereoscopic image pair may be converted from the second color space to the first color space.

DETAILED DESCRIPTION OF EMBODIMENTS

Figure 1:
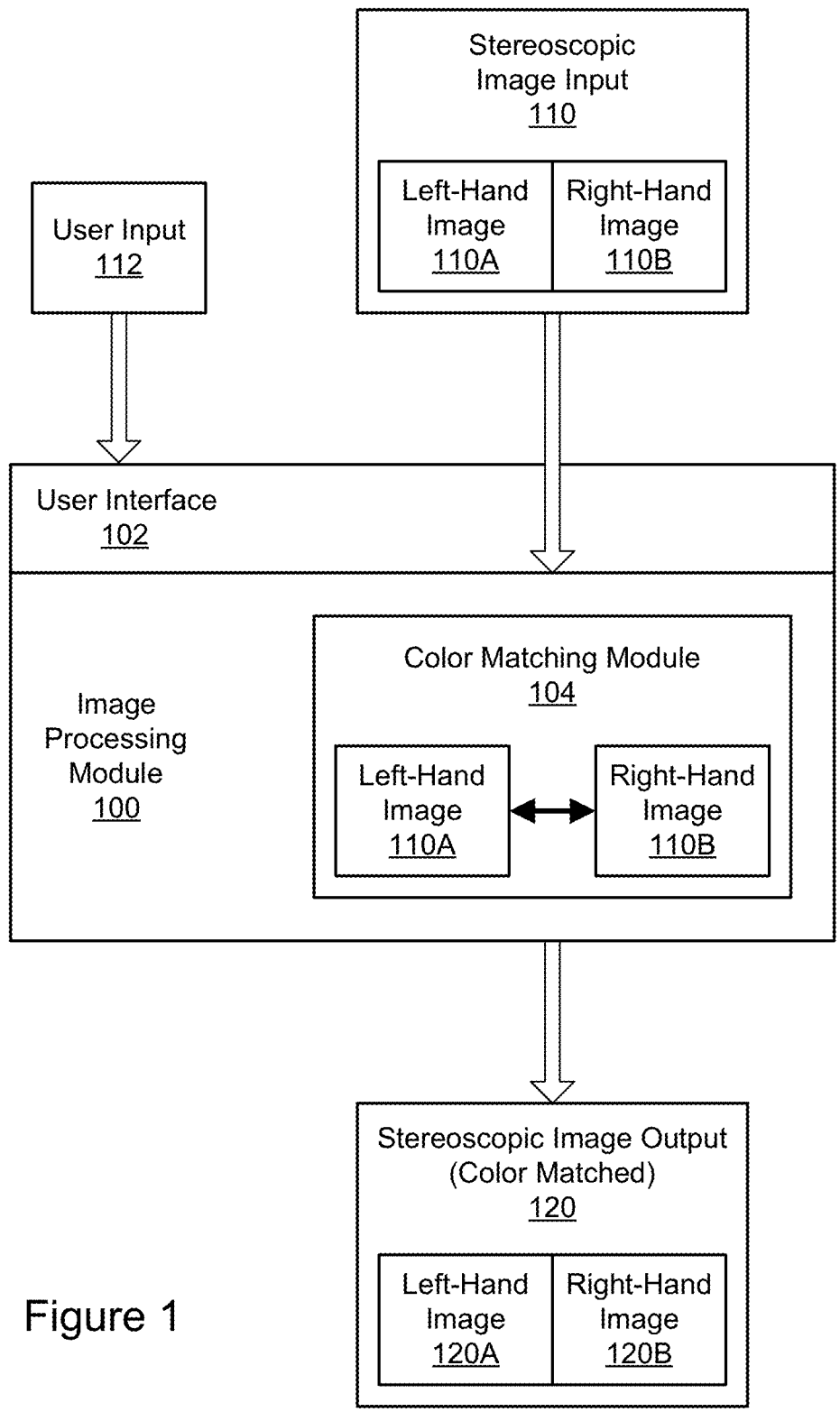
FIG. 1 illustrates an example of an image processing module configured for automatically matching colors in stereoscopic image pairs, according to one embodiment.

Using embodiments of the systems and methods described herein, two images in a stereoscopic image pair may be color-matched to one another automatically. Prior to the color-matching operation, the two images may have dissimilar colorimetric properties. The dissimilar colorimetric properties may result from differences between the optical paths used to capture the two images or from any other imperfections in the capture device.

In order to color match a stereoscopic image pair, color transformations may be applied to pixel values of the images in a different color space than the native color space of the images according to different luminance ranges. Each pixel of a stereoscopic image pair may be assigned a weight for each one of a plurality of luminance ranges. The weights may be based on the luminance of each pixel. The stereoscopic image pair may be converted from a first and less perceptually uniform color space (which may be, e.g., a native color space of the images) to a second and more perceptually uniform color space. While the image pair is in the second color space, a plurality of color transformations may be determined for the pixels in both images of the stereoscopic image pair. Each of the color transformations may correspond to a different luminance range such as the shadows, the midtones, and the highlights of each image. The color transformations may be determined based on a comparison of the pixels in the first image to the pixels in the second image. The color transformations may be applied to the different luminance ranges in both images in the second color space in order to match the colors of the two images. The color transformations may be applied differently to individual pixels based on the luminance weights of the pixels. The color-matched stereoscopic image pair may then be converted from the second color space back to the first color space.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In one embodiment, the methods and systems for automatically matching colors in stereoscopic image pairs may be applied to an entire sequence of images such as a stereoscopic 3D video sequence. In one embodiment, the methods and systems for automatically matching colors in stereoscopic image pairs may preserve as many of the original color values as possible; in other words, the methods and systems may be as non-destructive as possible and thus may minimize any potential color banding or posterization in the output image pair. In one embodiment, the methods and systems for automatically matching colors in stereoscopic image pairs may not produce discontinuities or inverted segments in the color range of the output image pair. In one embodiment, the methods and systems for automatically matching colors in stereoscopic image pairs may be symmetrical in terms of applying half of each transformation to each image of the image pair. In one embodiment, the methods and systems for automatically matching colors in stereoscopic image pairs may be computationally efficient but may also result in a sufficiently close visual match in terms of the colorimetric properties of the two images in the resulting image pair.

FIG. 1 illustrates an example image processing module 100 that may implement embodiments of methods and systems for automatically matching colors in stereoscopic image pairs. In one embodiment, image processing module 100 may provide a user interface 102 that includes one or more user interface elements via which a user may initiate, interact with, direct, and/or control the methods performed by module 100. In one embodiment, the user interface 102 may comprise a graphical user interface (GUI) including one or more user interface controls and one or more elements for displaying image content. Image processing module 100 may obtain stereoscopic image input 110. The stereoscopic image input 110 may comprise a stereoscopic image pair or a sequence of stereoscopic image pairs suitable for playback as digital video. For example, the stereoscopic image input 110 may include a left-hand image 110A and a right-hand image 110B forming a stereoscopic image pair. In one embodiment, image processing module 100 may also obtain user input 112, such as one or more instructions to perform the method for automatically matching colors in stereoscopic image pairs. In various embodiment, the techniques for automatically matching colors in stereoscopic image pairs may be performed automatically by the image processing module 100 and/or upon receiving an appropriate instruction from a user (e.g., user input 112).

A color matching module 104 may be configured for automatically matching colors in stereoscopic image pairs. As will be described in greater detail below, the color matching module 104 may determine one or more color transformations based on analysis of the two images in the stereoscopic image input 110 (e.g., left-hand image 110A and right-hand image 110B) and then may apply the transformation(s) to the stereoscopic image input 110 to generate a color-matched stereoscopic image output 120 (e.g., including left-hand image 120A and right-hand image 120B). In one embodiment, the process(es) performed by the color matching module 104 may be performed automatically and/or programmatically.

Image processing module 100 may be implemented as or in a stand-alone application or as a module of or plug-in for an image processing and/or presentation application. Examples of types of applications in which embodiments of image processing module 100 may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed. Specific examples of applications in which embodiments may be implemented include, but are not limited to, Adobe® SpeedGrade®, Adobe® Premiere®, Adobe® Photoshop®, and Adobe® Illustrator®. In addition to generating the stereoscopic image output 120, image processing module 100 may be used to display, manipulate, modify, and/or store the stereoscopic image output 120, for example to a memory medium or storage medium.

Figure 2:
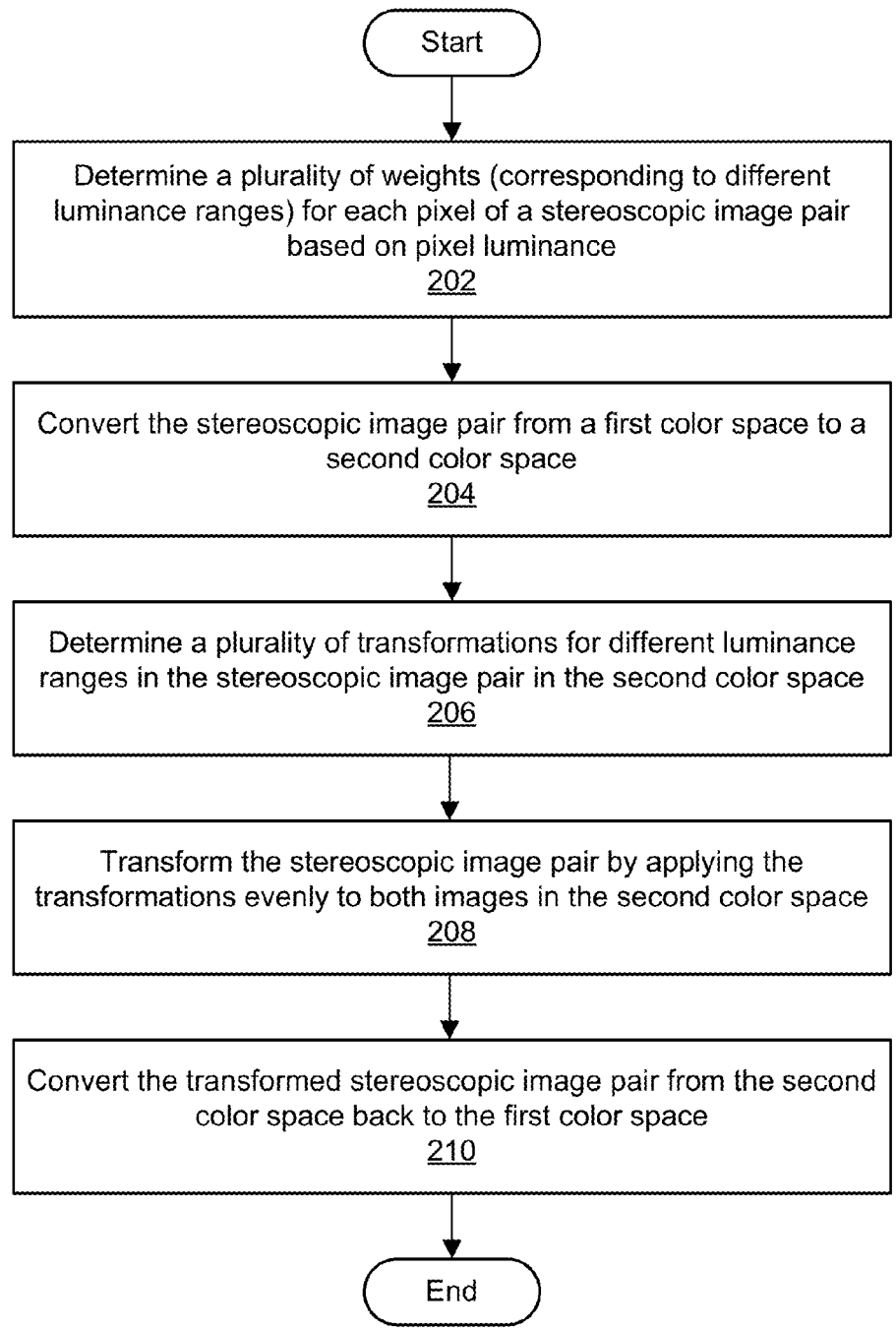
FIG. 2 is a flowchart illustrating a method for automatically matching colors in stereoscopic image pairs, according to one embodiment.

FIG. 2 is a flowchart illustrating a method for automatically matching colors in stereoscopic image pairs, according to one embodiment. The method shown in FIG. 2 may be used in conjunction with embodiments of the computer system shown in FIG. 6, among other devices. In various embodiments, some of the method elements shown may be performed concurrently, in a different order than shown, or may be omitted. Additional method elements may also be performed as desired. Any of the method elements described may be performed automatically (i.e., without direct user intervention) and/or programmatically (i.e., by execution of program instructions). As shown, this method may operate as follows.

As shown in 202, a plurality of weights may be determined for each pixel of a stereoscopic image pair. The stereoscopic image pair comprises a first image and a second image. The weights may be determined dependent on a respective luminance of each pixel of each image in the pair. Each of the plurality of weights for each pixel may correspond to a different luminance range within the image. In one embodiment, the weights comprise a shadow weight, a midtone weight, and a highlight weight for the respective luminance ranges of shadows, midtones, and highlights. In this manner, the relative contribution of each pixel may be determined for one or more luminance categories (e.g., the shadows, midtones, and highlights) for each image in the stereoscopic image pair.

Figure 3:
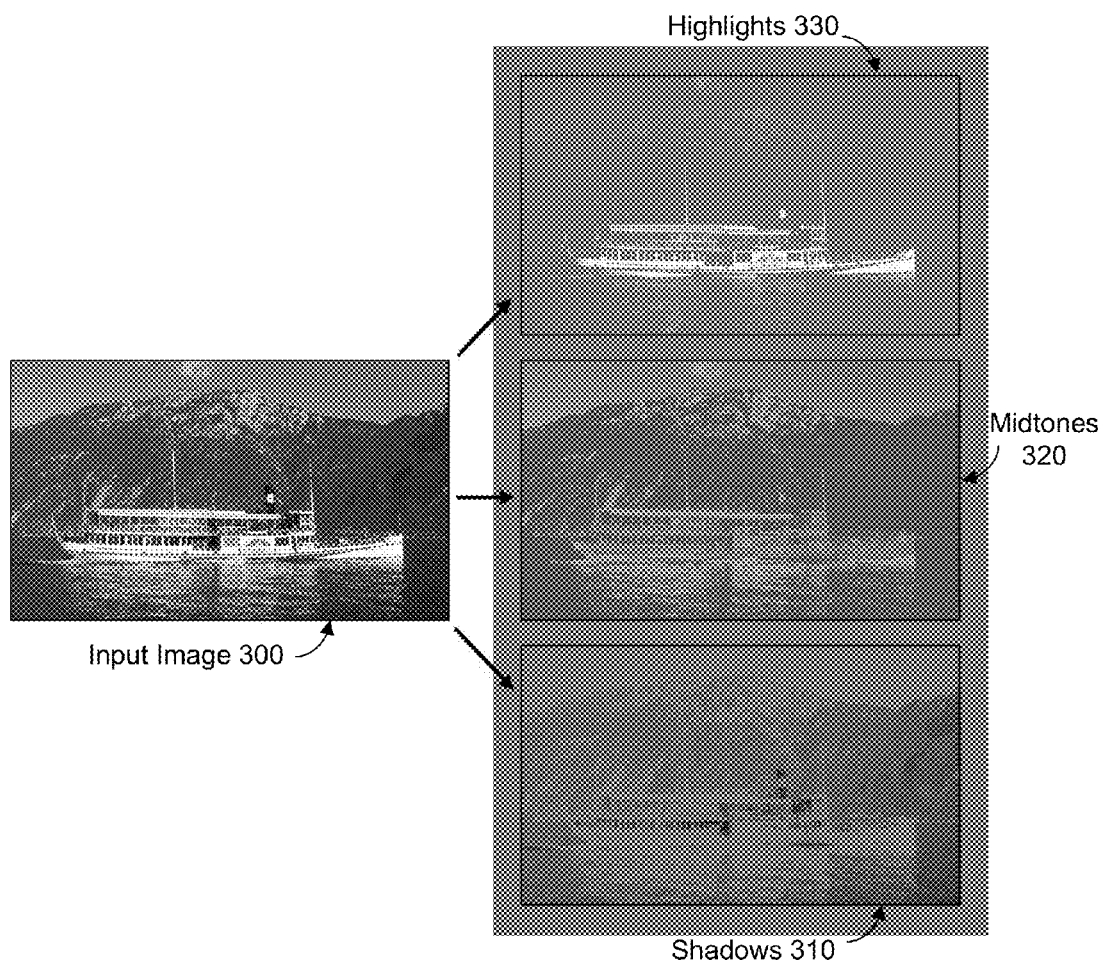
FIG. 3 illustrates a contribution of pixels in an input image to different luminance ranges, according to one embodiment.

FIG. 3 illustrates a contribution of pixels in an input image to different luminance ranges, according to one embodiment. Each pixel in an input image 300 may be assigned to one or more of a plurality of luminance ranges and given a weight for any range to which the pixel is assigned. For example, each pixel in the input image 300 may be assigned a weight for the shadows 310, the midtones 320, and/or the highlights 330 of the input image. The weighting for a pixel in any of the categories may be determined based on its luminance. In this manner, the input pixels may be separated into different luminance ranges such as the shadows 310, midtones 320, and/or highlights 330 of the input image 300.

Figure 4:
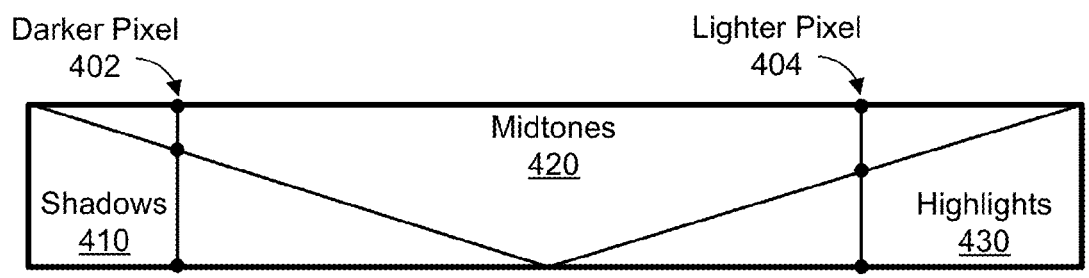
FIG. 4 illustrates an example of pixel weighting for automatically matching colors in stereoscopic image pairs, according to one embodiment.

FIG. 4 illustrates an example of pixel weighting for automatically matching colors in stereoscopic image pairs, according to one embodiment. The x-axis in the graph shown in FIG. 4 may represent the luminance of a pixel in the input image 300, ranging from black on the left-hand side to white on the right-hand side. In one embodiment, the shadows 410 may comprise approximately 25% of the input image 300, the midtones 420 may comprise approximately 50%, and the highlights 430 may comprise approximately 25%. In one embodiment, an individual pixel may typically be assigned to two categories or ranges: the shadows 410 and midtones 420 or the midtones 420 and highlights 430. For a pixel assigned to more than one luminance range, its weight in each luminance range (i.e., its contribution to each luminance range) may differ. In the example illustrated in FIG. 4, the darker pixel 402 may be weighted approximately 70% in the shadows 410 and approximately 30% in the midtones 420. The example of the lighter pixel 404 may be weighted approximately 43% in the midtones 420 and approximately 57% in the highlights 430.

Turning back to FIG. 2, as shown in 204, the stereoscopic image pair may be converted from a first color space to a second color space. A color space is considered perceptually uniform if uniform changes to color values in the color space correspond to uniform changes in perceived color. In one embodiment, the first color space may comprise an RGB (red, green, blue) color space. Because the RGB color space is not perceptually uniform, a small numerical difference in any of the RGB values may produce a large perceptual difference in color to a human viewer. Therefore, the second color space may be more perceptually uniform than the first color space, such that changes to color values in the second color space tend to produce more uniform perceptual differences than the same changes to color values in the first color space. In one embodiment, the second color space may comprise any color space that is perceptually uniform for human vision, such as the $l\alpha\beta$ color space. In another embodiment, the second color space may comprise the Lab color space (i.e., a color-opponent space with dimension L for lightness and a and b for the color-opponent dimensions) rather than the $l\alpha\beta$ color space. In various embodiments, the second color space may comprise any color space that is perceptually uniform for natural images or for artificial images.

The $l\alpha\beta$ color space is a perceptual color space in which three color axes are decorrelated for the vast majority of natural images (e.g., unaltered photographs). The $l\alpha\beta$ color space may provide a set of three principal axes (l, $\alpha$, $\beta$) that encode fluctuations along an achromatic dimension, a yellow-blue opponent direction, and a red-green opponent direction. The $l\alpha\beta$ color space may be described by the following conversion matrix:

$$\begin{bmatrix} L \\ \alpha \\ \beta \end{bmatrix} = \begin{bmatrix} \frac{1}{\sqrt{3}} & 0 & 0 \\ 0 & \frac{1}{\sqrt{6}} & 0 \\ 0 & 0 & \frac{1}{\sqrt{2}} \end{bmatrix} \begin{bmatrix} 1 & 1 & 1 \\ 1 & 1 & -2 \\ 1 & -1 & 0 \end{bmatrix} \begin{bmatrix} \log L \\ \log M \\ \log S \end{bmatrix}$$

where:

$$\begin{bmatrix} \log L \\ \log M \\ \log S \end{bmatrix} = \begin{bmatrix} \log_{10}(L+1) \\ \log_{10}(M+1) \\ \log_{10}(S+1) \end{bmatrix}$$

and:

$$\begin{bmatrix} L \\ M \\ S \end{bmatrix} = \begin{bmatrix} 0.3811 & 0.5783 & 0.0402 \\ 0.1967 & 0.7244 & 0.0782 \\ 0.0241 & 0.1288 & 0.8444 \end{bmatrix} \begin{bmatrix} R \\ G \\ B \end{bmatrix}$$

As shown in 206, a plurality of transformations may be determined for the stereoscopic image pair in the second color space. Each of the transformations may be determined separately for each different range of luminance for each image. In one embodiment, a shadow transformation, a midtone transformation, and a highlight transformation may be determined. The transformations may be determined based on a comparison of the first image to the second image in the second color space. In one embodiment, each transformation may comprise one or more coefficients such as an offset and a slope.

Figure 5A:
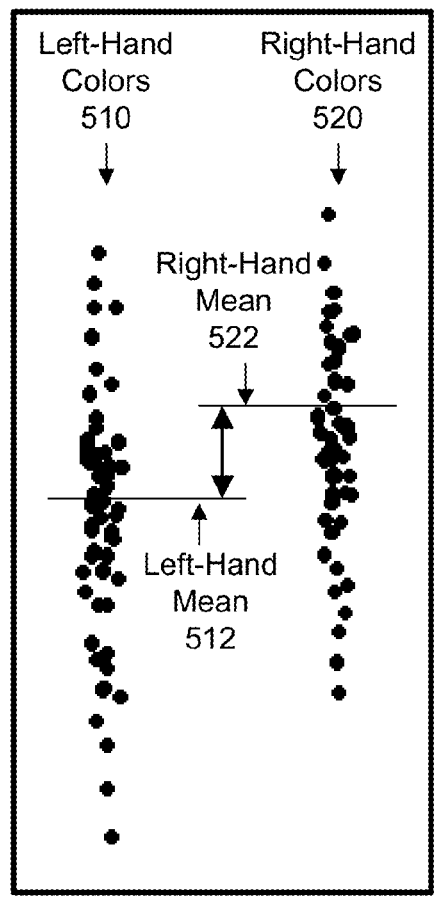
FIG. 5A illustrates an example of an offset calculation for automatically matching colors in stereoscopic image pairs, according to one embodiment.

In one embodiment, a mean value may be calculated for the color values (in the second color space) of each image in the stereoscopic image pair. Based on a comparison of the mean values, a suitable adjustment may be determined as part of the transformation. The adjustment based on the mean values may comprise an offset value. The offset may be added or subtracted to bring the color of the two images closer to one another. FIG. 5A illustrates an example of an offset calculation for automatically matching colors in stereoscopic image pairs, according to one embodiment. A left-hand mean 512 may be determined based on the color values 510 of a left-hand image of a stereoscopic image pair. Similarly, a right-hand mean 522 may be determined based on the color values 520 of a left-hand image of a stereoscopic image pair. The offset may be calculated as the difference between the two means 512 and 522.

Figure 5B:
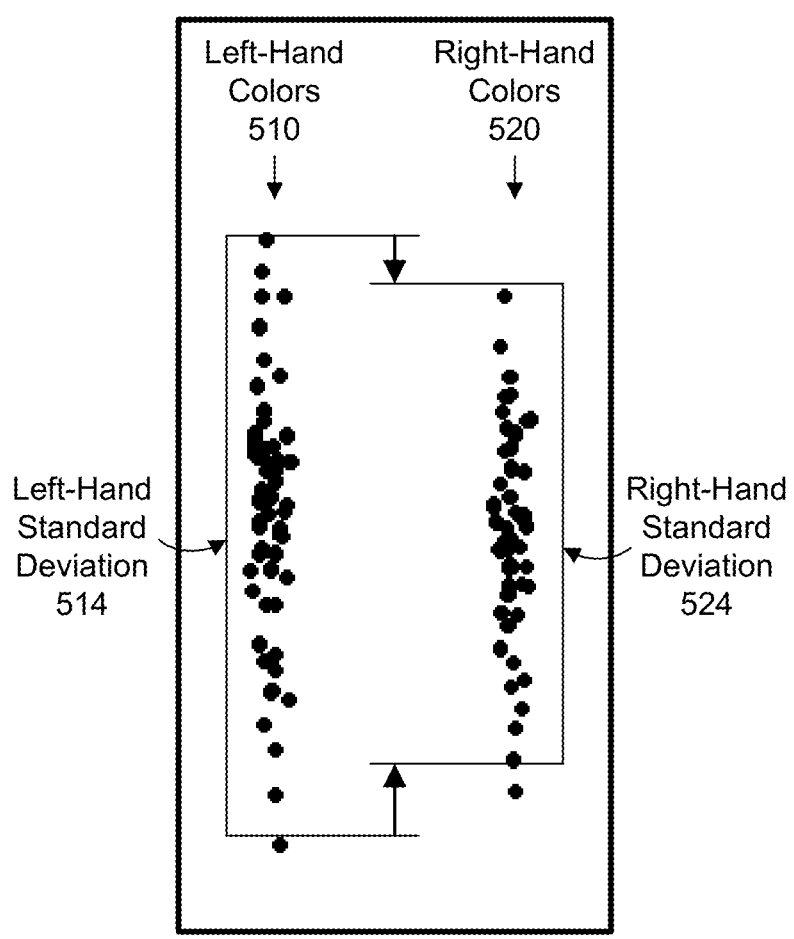
FIG. 5B illustrates an example of a slope calculation for automatically matching colors in stereoscopic image pairs, according to one embodiment.

In one embodiment, a standard deviation may be calculated for the color values (in the second color space) of each image in the stereoscopic image pair. Based on a comparison of the standard deviations, a suitable adjustment may be determined as part of the transformation. The adjustment based on the standard deviation values may comprise a slope value. The color values may be multiplied or divided by the slope to bring the color of the two images closer to one another. FIG. 5B illustrates an example of a slope calculation for automatically matching colors in stereoscopic image pairs, according to one embodiment. A left-hand standard deviation 514 may be determined based on the color values 510 of a left-hand image of a stereoscopic image pair. Similarly, a right-hand standard deviation 524 may be determined based on the color values 520 of a left-hand image of a stereoscopic image pair. The slope may be calculated as the quotient of the two standard deviations 514 and 524.

In one embodiment, the mean values and standard deviations may be calculated (and suitable transformations determined) for each luminance range (e.g., shadows, midtones, and highlights). In one embodiment, the transformations may therefore comprise an offset and a slope for shadows, an offset and a slope for midtones, and an offset and a slope for highlights. Each offset may be determined to be a difference between mean values of the two images for a particular luminance range. Each slope may be determined to be a quotient of standard deviations of the two images for a particular luminance range. In one embodiment, the mean values and standard deviations may be calculated (and suitable transformations determined) for each of three principal axes of the second color space (e.g., an achromatic axis, a yellow-blue opponent axis, and a red-green opponent axis in the $l\alpha\beta$ color space). Therefore, in one embodiment, the mean values and standard deviations may be calculated nine times for both images, and a corresponding nine transformations (an offset and a slope for each of the shadows, midtones, and highlights in each of the three axes) may be determined. In an alternative embodiment, the user may be permitted to selectively disable the application of the transformations to the different luminance ranges and/or to the different axes of the color space. In this manner, the computational efficiency of the automatic color matching operation may be increased at the potential expense of the closeness of the color match.

Turning back to FIG. 2, as shown in 208, the stereoscopic image pair may be transformed by applying the transformations to both images in the second color space. Each of the transformations may be equally or symmetrically distributed between the two images in the stereoscopic image pair. In other words, approximately half the transformation may be applied to each of the two images. For example, if an offset of 2 is calculated, then the offset may be distributed as +1 to the pixels of one image and −1 to the pixels of the other image. As another example, if a slope of 4 is calculated, then the pixels of one image may be multiplied by 2 (i.e., the square root of 4) while the pixels of the other image may be divided by 2. In one embodiment, every pixel in both images may potentially be altered by the transformations. The same luminance-based pixel weighting used to determine the contribution of the input pixels to the luminance ranges may be used to determine the relative effect of the transformations on individual pixels. For example, if a pixel is assigned 60% to the shadows and 40% to the midtones, then 60% of the shadow transformation and 40% of the midtone transformation may be applied to the pixel.

Figure 5C:
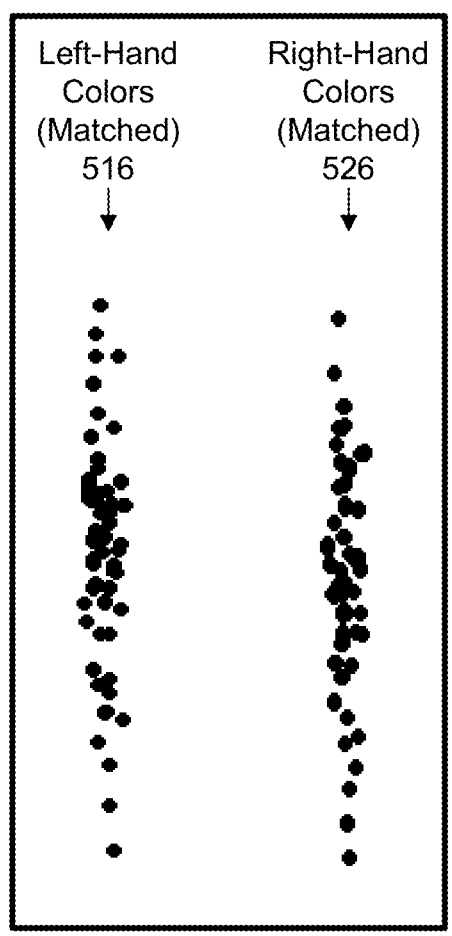
FIG. 5C illustrates an example of automatically matched colors in a stereoscopic image pair, according to one embodiment.

In this manner, the operation shown in 208 may generate a stereoscopic image pair in which the colors of both images are more closely matched than before the transformation. FIG. 5C illustrates an example of automatically matched colors in a stereoscopic image pair, according to one embodiment. By applying the offset and slope adjustments as described above, the transformed color values 516 of the left-hand image may more closely match the transformed color values 526 of the right-hand image. However, the range of color values may be mostly preserved to reduce potential artifacts such as color banding and posterization.

Turning back to FIG. 2, as shown in 210, the transformed stereoscopic image pair may be converted from the second color space back to the first color space. After the conversion back to the first color space (e.g., RGB), the transformed, color-matched stereoscopic image pair may be used for additional image processing operations using the image processing module 100. For example, a user may perform additional color grading on the color-matched stereoscopic image pair. The transformed stereoscopic image pair may also be displayed using any suitable display hardware, either as separate images or as a single image that creates an illusion of depth or three-dimensionality when viewed with a 3D display device and/or any associated viewing hardware (e.g., 3D glasses). In one embodiment, additional stereoscopic image pairs may be processed using the operations shown in 202-210 to transform all or part of a digital video sequence. In this manner, a stereoscopic 3D video sequence may be automatically color matched, frame by frame.

Figure 6:
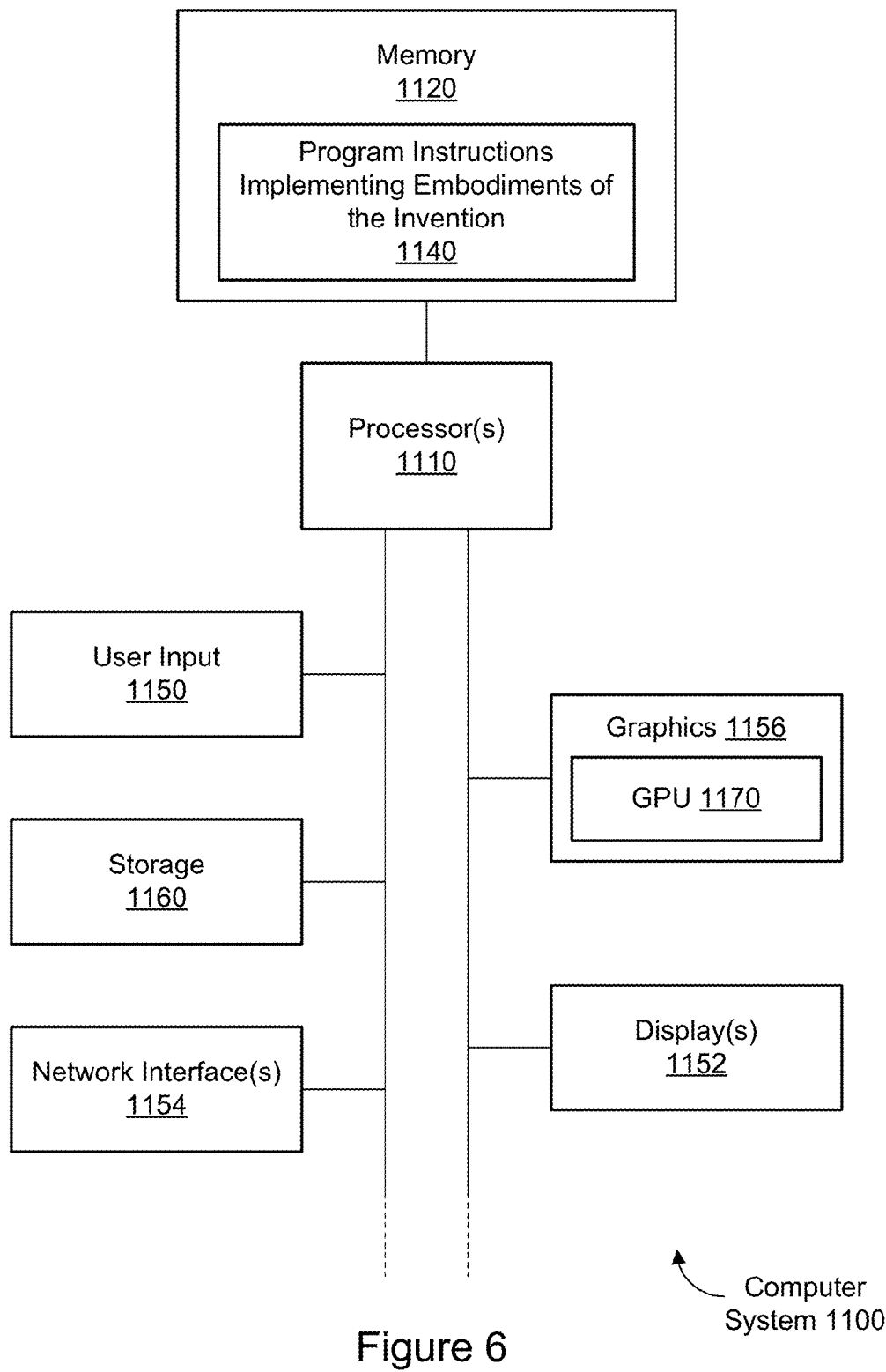
FIG. 6 is a block diagram of an example system configured to implement embodiments.

FIG. 6 is a block diagram illustrating constituent elements of a computer system 1100 that is configured to implement embodiments of the systems and methods described herein. The computer system 1100 may include one or more processors 1110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1100, such as various versions of Unix, Linux, Windows® from Microsoft Corporation, MacOS® from Apple Inc., or any other operating system that enables the operation of software on a hardware platform. The processor(s) 1110 may be coupled to one or more of the other illustrated components, such as a memory 1120, by at least one communications bus.

In one embodiment, a specialized graphics card or other graphics component 1156 may be coupled to the processor(s) 1110. The graphics component 1156 may include a graphics processing unit (GPU) 1170, which in some embodiments may be used to perform at least a portion of the techniques described below. The GPU 1170 may be configured to execute one or more pixel shader programs and/or one or more vertex shader programs. Additionally, the computer system 1100 may include one or more imaging devices 1152. The one or more imaging devices 1152 may include various types of raster-based imaging devices such as monitors and printers. In one embodiment, the one or more imaging devices 1152 may include a 2D display device and/or a 3D display device. In one embodiment, one or more display devices 1152 may be coupled to the graphics component 1156 for display of data provided by the graphics component 1156.

In one embodiment, program instructions 1140 that may be executable by the processor(s) 1110 to implement aspects of the techniques described herein may be partly or fully resident within the memory 1120 at the computer system 1100 at any point in time. The memory 1120 may be implemented using any appropriate medium such as any of various types of ROM or RAM (e.g., DRAM, SDRAM, RDRAM, SRAM, etc.), or combinations thereof. The program instructions may also be stored on a storage device 1160 accessible from the processor(s) 1110. Any of a variety of storage devices 1160 may be used to store the program instructions 1140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1160 may be coupled to the processor(s) 1110 through one or more storage or I/O interfaces. In some embodiments, the program instructions 1140 may be provided to the computer system 1100 via any suitable computer-readable storage medium including the memory 1120 and storage devices 1160 described above.

The computer system 1100 may also include one or more additional I/O interfaces, such as interfaces for one or more user input devices 1150. In addition, the computer system 1100 may include one or more network interfaces 1154 providing access to a network. It should be noted that one or more components of the computer system 1100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 1100 may also include numerous elements not shown in FIG. 6, as illustrated by the ellipsis.

In one embodiment, various of the operations shown in 202-210 may be performed on the GPU 1170. For example, the conversion to the second color space, the determination of the transformations, the application of the transformations, and the conversion back to the first color space may be performed by executing appropriate instructions (e.g., a pixel shader program) on the GPU 1170. In one embodiment, parallel processing capabilities of a processor(s) 1110 and/or GPU 1170 may be harnessed to perform the operations shown in 202-210. For example, weights for the two images in the image pair may be determined in parallel. As another example, different portions of a single image (e.g., the left-hand or right-hand image) may be processed simultaneously, e.g., as part of the weighting operation shown in 202. As another example, multiple frames in a stereoscopic video sequence may be processed in parallel using the operations shown in 202-210.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
 performing, by one or more computing devices:
  converting a stereoscopic image pair from a first color space to a second color space, comprising mapping color values in the first color space to color values in the second color space, the second color space is more perceptually uniform than the first color space;
  generating a color-matched stereoscopic image pair in the second color space, comprising applying a respective transformation for each of a plurality of luminance ranges in each image of the stereoscopic image pair, the transformations are applied to the color values in the second color space dependent upon a contribution of each of the color values to each of the luminance ranges; and
  mapping the transformed color values in the second color space back to the first color space to provide the color-matched stereoscopic image pair in the first color space.

2. The method as recited in claim 1, wherein the stereoscopic image pair comprises a left-hand image and a right-hand image, and wherein the method further comprises: determining the respective transformation for each of the plurality of luminance ranges in the stereoscopic image pair dependent on a comparison of color values in the left-hand image to color values in the right-hand image in the second color space.

3. The method as recited in claim 2, wherein the comparison comprises a comparison of a mean color value of the left-hand image to a mean color value of the right-hand image.

4. The method as recited in claim 2, wherein the comparison comprises a comparison of a standard deviation of the color values of the left-hand image to a standard deviation of the color values of the right-hand image.

5. The method as recited in claim 1, wherein the second color space comprises an achromatic axis, a yellow-blue opponent axis, and a red-green opponent axis.

6. The method as recited in claim 1, wherein each transformation comprises a respective offset and a respective slope.

7. The method as recited in claim 1, wherein the plurality of luminance ranges comprise a shadows range, a midtones range, and a highlights range.

8. A system, comprising:
 at least one processor; and
 a memory coupled to the at least one processor, the memory stores program instructions, the program instructions are executable by the at least one processor to perform operations comprising:
  converting a stereoscopic image pair from a first color space to a second color space, the program instructions are executable by the at least one processor to map color values in the first color space to color values in the second color space, wherein the second color space is more perceptually uniform than the first color space;
  generating a color-matched stereoscopic image pair in the second color space, the program instructions are executable by the at least one processor to apply a respective transformation for each of a plurality of luminance ranges in each image of the stereoscopic image pair, the transformations are applied to the color values in the second color space dependent upon a contribution of each of the color values to each of the luminance ranges; and
  converting the color-matched stereoscopic image pair from the second color space to the first color space.

9. The system as recited in claim 8, wherein the stereoscopic image pair comprises a left-hand image and a right-hand image, and wherein the program instructions are further executable by the at least one processor to:
 determine the respective transformation for each of the plurality of luminance ranges in the stereoscopic image pair dependent on a comparison of color values in the left-hand image to color values in the right-hand image in the second color space.

10. The system as recited in claim 9, wherein the comparison comprises a comparison of a mean color value of the left-hand image to a mean color value of the right-hand image.

11. The system as recited in claim 9, wherein the comparison comprises a comparison of a standard deviation of the color values of the left-hand image to a standard deviation of the color values of the right-hand image.

12. The system as recited in claim 8, wherein the second color space comprises an achromatic axis, a yellow-blue opponent axis, and a red-green opponent axis.

13. The system as recited in claim 8, wherein each transformation comprises a respective offset and a respective slope.

14. The system as recited in claim 8, wherein the plurality of luminance ranges comprise a shadows range, a midtones range, and a highlights range.

15. A computer-readable storage medium that is non-transitory and storing program instructions computer-executable to perform operations comprising:
   converting a stereoscopic image pair from a first color space to a second color space, comprising mapping color values in the first color space to color values in the second color space, the second color space is more perceptually uniform than the first color space;
   generating a color-matched stereoscopic image pair in the second color space, comprising applying a respective transformation for each of a plurality of luminance ranges in each image of the stereoscopic image pair, the transformations are applied to the color values in the second color space dependent upon a contribution of each of the color values to each of the luminance ranges; and
   converting the color-matched stereoscopic image pair from the second color space to the first color space.

16. The computer-readable storage medium as recited in claim 15, wherein the stereoscopic image pair comprises a left-hand image and a right-hand image, and wherein the program instructions are further computer-executable to perform:
   determining the respective transformation for each of the plurality of luminance ranges in the stereoscopic image pair dependent on a comparison of color values in the left-hand image to color values in the right-hand image in the second color space.

17. The computer-readable storage medium as recited in claim 16, wherein the comparison comprises a comparison of a mean color value of the left-hand image to a mean color value of the right-hand image.

18. The computer-readable storage medium as recited in claim 16, wherein the comparison comprises a comparison of a standard deviation of the color values of the left-hand image to a standard deviation of the color values of the right-hand image.

19. The computer-readable storage medium as recited in claim 15, wherein the second color space comprises an achromatic axis, a yellow-blue opponent axis, and a red-green opponent axis.

20. The computer-readable storage medium as recited in claim 15, wherein each transformation comprises a respective offset and a respective slope.

* * * * *